US012312783B2

(12) United States Patent
Schiffmann

(10) Patent No.: US 12,312,783 B2
(45) Date of Patent: May 27, 2025

(54) CONTAMINATION GUARD FOR WATER FAUCET

(71) Applicant: Dynamo Aviation, Inc., Chatsworth, CA (US)

(72) Inventor: Wolfgang Schiffmann, Kaltenkirchen Wacholderweg (DE)

(73) Assignee: DYNAMO AVIATION, INC., Chatsworth (CA)

( * ) Notice: Subject to any disclaimer, the term of this patent is extended or adjusted under 35 U.S.C. 154(b) by 432 days.

(21) Appl. No.: 17/805,108

(22) Filed: Jun. 2, 2022

(65) Prior Publication Data

US 2023/0392357 A1 Dec. 7, 2023

(51) Int. Cl.

*E03C 1/04* (2006.01)
*B05B 15/16* (2018.01)
*E03C 1/084* (2006.01)

(52) U.S. Cl.

CPC ............ *E03C 1/0404* (2013.01); *B05B 15/16* (2018.02); *E03C 1/084* (2013.01)

(58) Field of Classification Search

CPC ........ B05B 15/16; E03C 1/0404; E03C 1/084
USPC .................................... 239/288–288.5, 428.5
See application file for complete search history.

(56) References Cited

U.S. PATENT DOCUMENTS 4,749,126 A 6/1988 Kessener et al.
4,894,874 A 1/1990 Wilson
7,230,255 B2 6/2007 Shim
2013/0019975 A1 1/2013 Chen
2015/0158750 A1 6/2015 Schiffmann et al.
2020/0407955 A1 12/2020 Keel et al.
2021/0270021 A1 9/2021 Ohara et al.

FOREIGN PATENT DOCUMENTS

WO 2016156884 A1 10/2016

OTHER PUBLICATIONS

Patent Cooperation Treaty, International Search Report and Written Opinion for International Application No. PCT/US23/24176, Aug. 24, 2023, 8 pages.

*Primary Examiner* — Christopher S Kim
(74) *Attorney, Agent, or Firm* — Stetina Garred Brucker Newboles

(57) ABSTRACT

A contact guard for use with a water faucet housing having a discharge end portion configured to discharge water along a discharge axis. The contact guard includes an inner surface extending about a central axis, with the inner surface defining a central passageway extending between a proximal end portion and a distal end portion along the central axis. A plurality of guard extensions may be arranged in spaced relation to each other. At least one pair of adjacent guard extensions form an auxiliary flow channel in fluid communication with the central passageway. The auxiliary flow channel includes a radial component extending radially outward relative to the central axis and a secondary component angled relative to the radial component. The at last one pair of adjacent guard extensions include at least one portion that overlaps each other along an axis perpendicular to the central axis.

20 Claims, 3 Drawing Sheets

CONTAMINATION GUARD FOR WATER FAUCET

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to dispenser for a water faucet, and more specifically, to a dispenser configured to mitigate contamination of an interior surface of the dispenser, particularly from splashback of water dispensed from the water faucet.

2. Description of the Related Art

Water faucets are commonly used for dispensing water in residential and commercial structures. For instance, homes, office buildings, airplanes, etc. may all include faucets for dispensing water when desired by a user. Along these lines, an advantage associated with most water faucets is that a user may turn on the flow of water when water is needed, and then turn off the flow of water when the water is no longer needed.

Despite the widespread use of water faucets, a common drawback associated with conventional water faucets is human contact with the faucet, which may lead to contamination of water that may flow through the faucet. Even in a contactless water flow arrangement, there is a possibility of contacting the faucet or water-pipe by contaminated objects, e.g. the hands of a human user. Due to such possible contact, germs present on hands can easily be transmitted to water faucet interior surfaces and thus reach the biofilm of a water system through the water faucet discharge or outlet. In addition, contamination of the water faucet surfaces and thereby of the biofilm happens, as indicated above, when these come in contact with the body secretions caused by coughing, sneezing etc.

In addition to contamination through physical contact, contamination may also occur as the result of splashback of water toward the faucet. In this regard, as the water leaves the faucet under pressure, the water may impact the user's hands or another surface, and splash back toward the faucet. When the water being splashed toward the faucet includes germs or other contaminants, the contamination may occur in a direction opposite to that of the direction of flow, which may be commonly referred to as retrograde contamination.

Previous approaches to provide largely germ-free water for human consumption included various technologies (e.g., UV-C disinfection, carbon filter, etc.) for treating water before being discharged from the faucet for human consumption. However, even after using these technologies, contamination of the biofilm could still be possible due to contamination of water in the areas beyond such previously available systems, and the delivery of completely germ-free water from the water faucet may not be guaranteed.

The biofilm present in water system may represents the boundary layer between the water and the water supply (water-pipe), in which nutrients and other substances may be present in a dissolved form. The presence of germs in the biofilm may pose serious health hazards to humans.

Accordingly, there is a need to stop the contamination of the biofilm in the water delivery system or which can decompose the harmful germs, organic compounds or organisms present in the biofilm. Various aspects of the present disclosure address this particular need, as will be discussed in more detail below.

BRIEF SUMMARY

In accordance with one embodiment of the present disclosure, there is provided a contact guard for use with a water faucet housing having a discharge end portion configured to discharge water along a discharge axis. The contact guard includes a proximal body configured to be engageable to the faucet housing. The proximal body includes a proximal central passageway extending along a proximal central axis, with the proximal central passageway being alignable with the discharge axis when the proximal body is engaged with the faucet housing. A proximal flange extends radially outward relative to the proximal central passageway. The proximal flange includes a first surface and an opposing second surface, with the first surface being positioned adjacent the faucet housing when the proximal body is engaged to the faucet housing. A proximal guard extends from the proximal flange in a radial direction, away from the proximal central axis, and an axial direction, parallel to the proximal central axis and away from the first surface of the proximal flange. The proximal guard terminates at a proximal guard tip edge residing in a proximal guard tip plane. An intermediate body is connectable to the proximal body. The intermediate body includes an intermediate central passageway extending along an intermediate central axis. The intermediate central passageway is alignable with the proximal central passageway when the intermediate body is connected to the proximal body. An intermediate flange extends radially outward relative to the intermediate central passageway. The intermediate flange includes a first surface and an opposing second surface, with the first surface being positioned adjacent the proximal body when the intermediate body is engaged to the proximal body. An intermediate guard extends from the intermediate flange in a radial direction, away from the intermediate central axis, and an axial direction, parallel to the intermediate central axis and away from the first surface of the intermediate flange. The intermediate guard terminates at an intermediate guard tip edge residing in an intermediate guard tip plane. The intermediate body and the proximal body are configured such that when the intermediate body is connected to the proximal body, the first surface of the intermediate flange resides between the proximal guard tip plane and the second surface of the proximal flange. A distal body is connectable to the intermediate body, with the distal body having a distal central passageway extending along a distal central axis. The distal central passageway is alignable with the intermediate central passageway when the distal body is connected to the intermediate body. A distal flange extends radially outward relative to the distal central passageway. The distal flange includes a first surface and an opposing second surface, with the first surface being positioned adjacent the intermediate body when the distal body is engaged to the intermediate body. A distal guard extends from the distal flange in a radial direction, away from the distal central axis, and an axial direction, parallel to the distal central axis and away from the first surface of the distal flange, the distal guard terminating at a distal guard tip edge. The distal body and the intermediate body are configured such that when the distal body is connected to the intermediate body, the first surface of the distal flange resides between the intermediate guard tip plane and the second surface of the intermediate flange.

The proximal body may include an annular channel extending into the proximal flange from the second surface of the proximal flange. The intermediate body may include an annular wall configured to be receivable within the annular channel to facilitate engagement between the proximal body and the intermediate body.

The intermediate body may include an annular channel extending into the intermediate flange from the second surface of the intermediate flange. The distal body may include an annular wall configured to be receivable within the annular channel to facilitate engagement between the intermediate body and the distal body.

The proximal body may be configured to be threadingly engageable with the intermediate body. The intermediate body may be configured to be threadingly engageable with the distal body.

The contact guard may additionally include an aerator coupled to the proximal body and in fluid communication with the proximal central passageway.

The proximal body may include a cylindrical wall extending from the proximal flange and around the proximal central axis, with the cylindrical wall being configured to facilitate engagement with the faucet housing.

The contact guard may additionally include a conical end portion extending from the distal flange.

According to another embodiment, there is provided a contact guard for use with a water faucet housing having a discharge end portion configured to discharge water along a discharge axis. The contact guard includes an inner surface extending about a central axis, with the inner surface having a proximal end portion and a distal end portion and defining a central passageway extending between the proximal end portion and the distal end portion along the central axis. A plurality of guard extensions may be arranged in spaced relation to each other. At least one pair of adjacent guard extensions form an auxiliary flow channel in fluid communication with the central passageway. The auxiliary flow channel includes a radial component extending radially outward relative to the central axis and a secondary component angled relative to the radial component. The at last one pair of adjacent guard extensions include at least one portion that overlaps each other along an axis perpendicular to the central axis.

The inner surface and the plurality of guard extensions may be formed from a single unitary structure.

The plurality of guard extensions may be detachably connectable to each other.

The auxiliary flow channel may include a curved segment.

The contact guard may additionally include at least one LED positioned in optical alignment with the inner surface.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
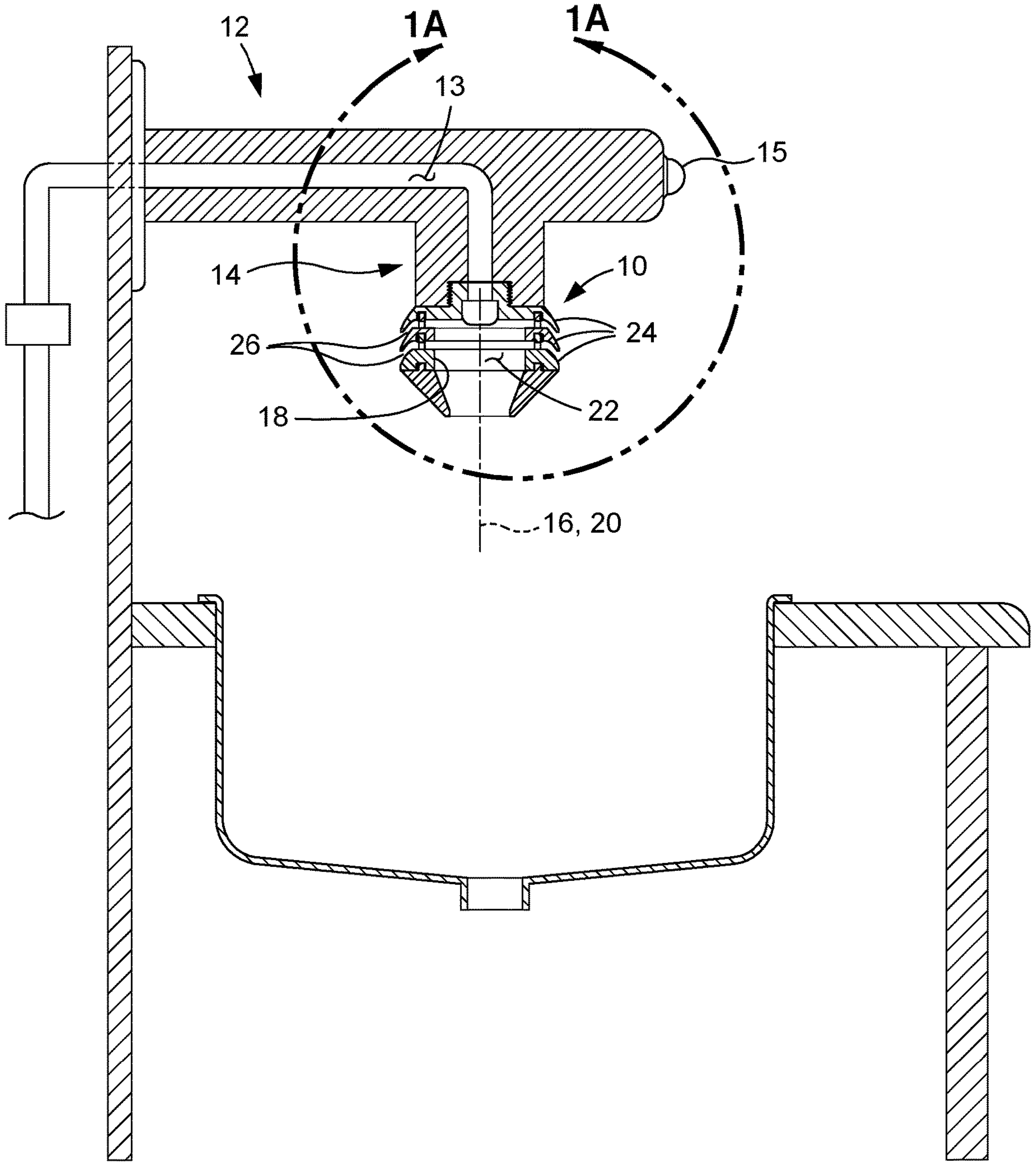
FIG. 1 is a side cross sectional view of a faucet fitted with a contact guard at its dispensing end portion.
Figure 1A:
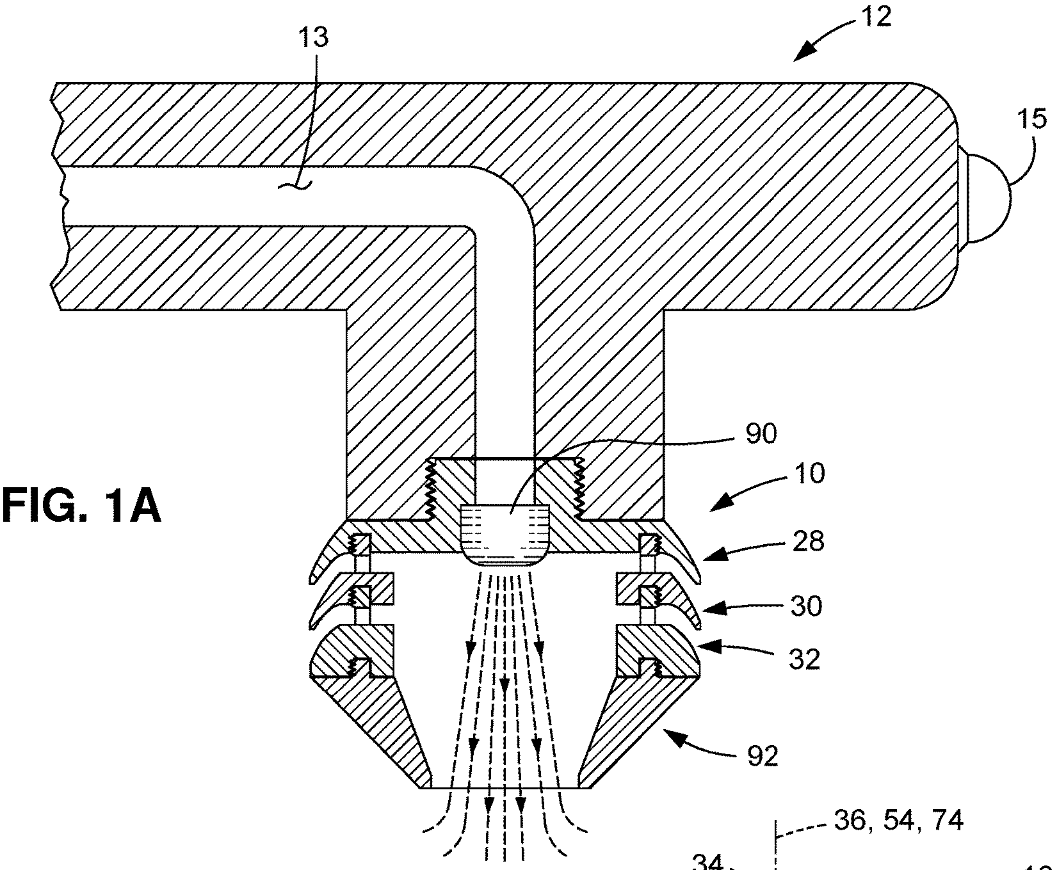
FIG. 1A is an enlarged side cross sectional view of the contact guard and an adjacent end portion of the faucet.

The detailed description set forth below in connection with the appended drawings is intended as a description of certain embodiments of a contact guard for a faucet and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating a preferred embodiment of the present disclosure, and are not for purposes of limiting the same, there is depicted a contact guard 10 for use with a water faucet housing 12, with the contact guard 10 being sized and configured to provide protection against contamination of the water line within the water faucet housing 12. In this regard, the contact guard 10 may provide a physical barrier around the water dispensed from the water faucet housing 12 to protect against physical contact with the user. In addition, the contact guard 10 may be particularly configured to protect against retrograde contamination (e.g., contamination associated with splashback) by inhibiting the migration of splashback into the water line that supplies water the water faucet housing 12. Such protection may be achieved through the use of overlapping peripheral guard members, which are separated from each other to form auxiliary passageways in fluid communication with a central channel, through which the water is dispensed. It is also contemplated that UV light sources may also be used, as well as sanitizing surface coatings (e.g., Titanium Dioxide) to provide additional sanitizing power as secondary lines of defense against possible contaminants. The contact guard 10 may be configured to be retrofit onto an existing water faucet housing 12, or directly integrated into a new water faucet housing 12. Although the contact guard 10 may be used with almost any water faucet housing 12, various iterations of the contact guard 10 described herein may find particular appeal for water faucets on an airplane, where the associated water system may include a large reservoir where water may not be cycled through the system to naturally remove contaminants.

The water faucet housing 12 may include an internal passageway 13, and a discharge end portion 14 configured to discharge water along a discharge axis 16, typically over a sink. Many water faucet housings 12 may be configured such that the discharge axis 16 is aligned with a generally downward direction, although the scope of the present disclosure is not limited thereto. A proximity sensor 15 may be coupled to the water faucet housing 12 and may be configured to control the flow of water therethrough to only when a user is present in close proximity to the water faucet housing 12. The proximity sensor 15 may be operatively coupled to a control valve or other flow control mechanism to facilitate flow control through the discharge end portion 14.

The contact guard 10 may include an inner surface 18 extending about a central axis 20. In the exemplary embodiment depicted in FIGS. 1-1C, the inner surface 18 may be collectively defined by a plurality of surface segments (e.g., a proximal segment, an intermediate segment and/or a distal segment). In this regard, the inner surface 18 may not be one continuous surface, but instead, may be comprised of discrete surface segments. The inner surface 18 may include a proximal end portion (e.g., closest to the water faucet housing 21) and a distal end portion (furthest from the water faucet housing 12), and may define a central passageway 22 extending between the proximal end portion and the distal end portion along the central axis 20. The contact guard 10 may additionally include a plurality of guard extensions 24 at an outer periphery thereof to provide a physical barrier around the central passageway 22. The guard extensions 24 may define one or more auxiliary passageways 26, with each auxiliary passageway 26 being defined by an adjacent pair of guard extensions 24. The auxiliary passageways 26, may function as overflow passageways in communication with the central passageway 22. The auxiliary passageways 26 may include a radial component extending radially outward relative to the central axis 20 and a secondary component angled relative to the radial component. The transition between the radial component and the secondary component may define a curved or arcuate segment of the auxiliary passageway 26. An adjacent pair of adjacent guard extensions 24 may include at least one portion that overlaps each other, which may prohibit inadvertent splashback of water into the faucet housing 12. In this regard, the overlapping configuration may prevent any splashback from entering the central passageway 22, and instead, the splashback may simply flow downwardly over the downwardly extending guard extensions 24 and into the sink without contaminating the primary water line.

Figure 1B:
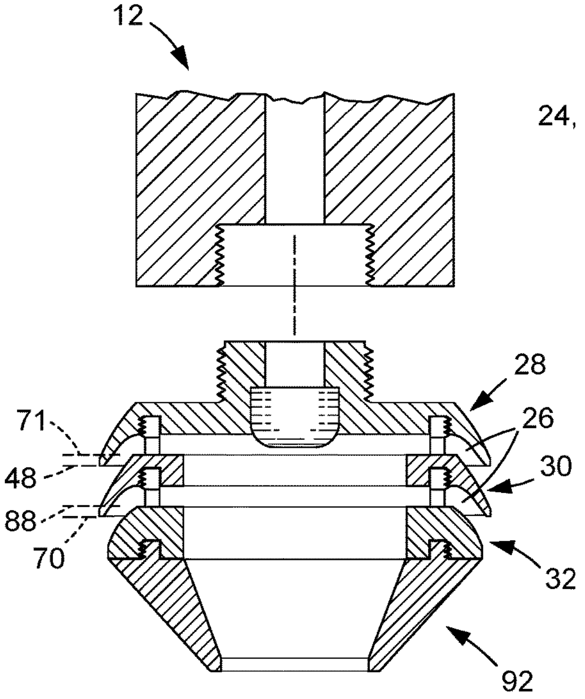
FIG. 1B is a side cross sectional view of the contact guard exploded off of the faucet.
Figure 1C:
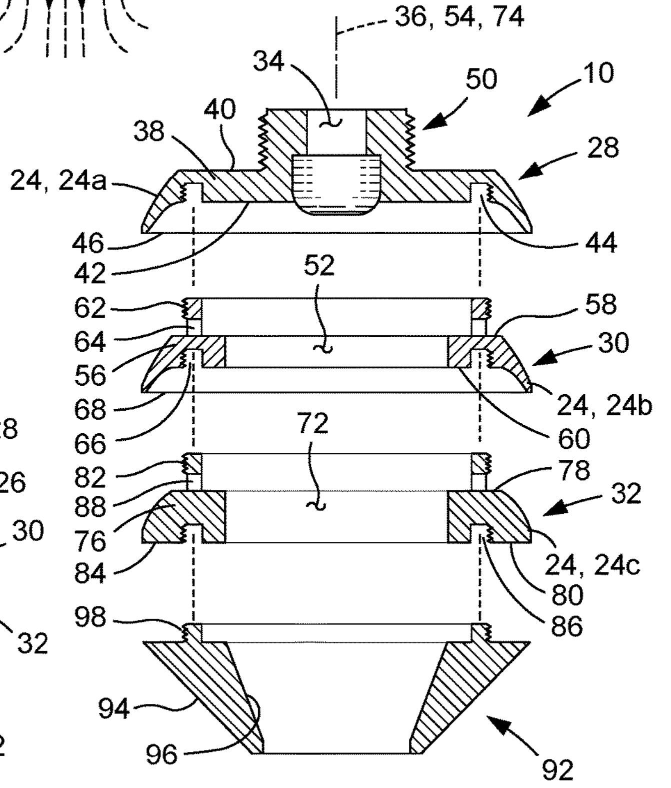
FIG. 1C is an exploded side view of the contact guard.

It is contemplated that the contact guard 10 may be formed as a unitary structure, or as an assembly of several different components. The embodiment depicted in FIGS. 1-1C is formed of several components including a proximal body 28, an intermediate body 30, and a distal body 32. The proximal body 28 may be configured to be engageable to the faucet housing 12 and may include a proximal central passageway 34 extending along a proximal central axis 36, with the proximal central passageway 34 being alignable with the discharge axis 16 when the proximal body 28 is engaged with the faucet housing 12.

A proximal flange 38 extends radially outward relative to the proximal central passageway 34. The proximal flange 38 includes a first surface 40 and an opposing second surface 42, with the first surface 40 being positioned adjacent the faucet housing 12 when the proximal body 28 is engaged to the faucet housing 12. The proximal body 28 may include an annular channel 44 extending into the proximal flange 38 from the second surface 42 of the proximal flange 38.

A proximal guard 24*a* (e.g., the guard extension 24 formed on the proximal body 28) extends from the proximal flange 38 in a radial direction, away from the proximal central axis 36, and an axial direction, parallel to the proximal central axis 36 and away from the first surface 40 of the proximal flange 38. The proximal guard 24*a* terminates at a proximal guard tip edge 46 residing in a proximal guard tip plane 48.

The proximal body 28 may additionally include a cylindrical wall 50 extending from the proximal flange 38 and around the proximal central axis 36, with the cylindrical wall 50 being configured to facilitate engagement with the faucet housing 12. In one embodiment, the cylindrical wall 50 is externally threaded and may be threadingly engageable with a corresponding internally threaded bore formed on the water faucet housing 12. However, other attachment structures known in the art may also be used without departing from the spirit and scope of the present disclosure.

The proximal body 28 may be configured to be connectable to the intermediate body 30, which may include an intermediate central passageway 52 extending along an intermediate central axis 54. The intermediate central passageway 52 is alignable with the proximal central passageway 34 when the intermediate body 30 is connected to the proximal body 28. An intermediate flange 56 extends radially outward relative to the intermediate central passageway 52 and includes a first surface 58 and an opposing second surface 60, with the first surface 58 being positioned adjacent the proximal body 28 when the intermediate body 30 is engaged to the proximal body 28. An annular wall 62 may extend from the first surface 58 and may be configured to be receivable within the annular channel 44 on the proximal body 28 to facilitate engagement between the proximal body 28 and the intermediate body 30. In this regard, the annular wall 62 may be complementary in configuration to that of the annular channel 44. The annular wall 62 may also include openings or perforations 64 formed therein, which may accommodate fluid flow therethrough, as will be described in more detail below. The perforations 64 may form part of the auxiliary channel 26, or may be in communication with the auxiliary channel 26. The intermediate body 30 may additionally include an annular channel 66 extending into the intermediate flange 56 from the second surface 60 of the intermediate flange 56.

An intermediate guard 24*b* (e.g., the guard extension 24 on the intermediate body 30) extends from the intermediate flange 56 in a radial direction, away from the intermediate central axis 54, and an axial direction, parallel to the intermediate central axis 54 and away from the first surface 58 of the intermediate flange 56. The intermediate guard 24*b* terminates at an intermediate guard tip edge 68 residing in an intermediate guard tip plane 70. The intermediate body 30 and the proximal body 28 are configured such that when the intermediate body 30 is connected to the proximal body 28, the first surface 58 of the intermediate flange resides between the proximal guard tip plane 48 and the second surface 42 of the proximal flange 38. FIG. 1B depicts an overlapping configuration between the proximal guard 24*a* and the intermediate guard 24*b*, with the proximal guard tip plane 48 residing below a plane 71 defined by the first surface 58 of the intermediate flange 56. The distance between proximal guard tip plane 48 and plane 71 represents a degree of overlap between the proximal guard 24*a* and the intermediate guard 24*b*.

The intermediate body 30 is configured to be connectable to the distal body 32, which includes a distal central passageway 72 extending along a distal central axis 74. The distal central passageway 72 is alignable with the intermediate central passageway 52 when the distal body 32 is connected to the intermediate body 30. A distal flange 76 extends radially outward relative to the distal central passageway 72. The distal flange 76 includes a first surface 78 and an opposing second surface 80, with the first surface 78 being positioned adjacent the intermediate body 30 when the distal body 32 is engaged to the intermediate body 30. An annular wall 82 may extend from the first surface 78 and may be configured to be receivable within the annular channel 66 on the intermediate body 30 to facilitate engagement between the intermediate body 30 and the distal body 32. In this regard, the annular wall 82 may be complementary in configuration to that of the annular channel 66 of the intermediate body 30. The annular wall 82 may also include openings or perforations 88 formed therein, which may accommodate fluid flow therethrough. The perforations 88 may form part of an auxiliary passageway 26 or may be in communication with an auxiliary passageway 26.

A distal guard 24*c* (e.g., the guard extension 24 formed on the distal body 32) extends from the distal flange 76 in a radial direction, away from the distal central axis 74, and an axial direction, parallel to the distal central axis 74 and away from the first surface 78 of the distal flange 76. The distal guard 24*c* may terminate at a distal guard tip edge 84.

The distal body 32 may additionally include an annular channel 86 extending into the distal flange 76 from the second surface 80 thereof.

The distal body 32 and the intermediate body 30 may be configured such that when the distal body 32 is connected to the intermediate body 30, the first surface 78 of the distal flange 76 resides between the intermediate guard tip plane 70 and the second surface 60 of the intermediate flange 56. FIG. 1B depicts an overlapping configuration between the intermediate guard 24*b* and the distal guard 24*c*, with the intermediate guard tip plane 70 residing below a plane 88 defined by the first surface 78 of the intermediate flange 76. The distance between plane 88 and intermediate guard tip plane 70 represents a degree of overlap between the intermediate guard 24*b* and distal guard 24*c*.

According to one embodiment, the proximal body 28 may be configured to be threadingly engageable with the intermediate body 30, and the intermediate body 30 may be configured to be threadingly engageable with the distal body 32. In this regard, the annular channels 44, 66 may be internally threaded and configured to threadingly engage with external threads formed on the corresponding annular walls 62, 82 that are received within the annular channels 44, 66. The threaded engagement may allow for selective height adjustment (e.g., positional adjustment) of the bodies 28, 30, 32 relative to each other. For instance, the intermediate body 30 may be moved slightly further away from the proximal body 28 by rotating the intermediate body 30 relative to the proximal body 28 in a first rotational direction, and alternatively, the intermediate body 30 may be moved slightly closer to the proximal body 28 by rotating the intermediate body 30 relative to the proximal body 28 in a second rotational direction. The same type of positional adjustment of the distal body 32 relative to the intermediate body 30 may be facilitated through the threaded engagement. The width of the auxiliary passageways 26 may be adjusted by adjusting the position of the bodies 28, 30, 32 relative to each other.

The contact guard 10 may additionally include an aerator 90 coupled to the proximal body 28 and in fluid communication with the proximal central passageway 34. The aerator 90 may configure the stream emitted by the water faucet housing 12 to prevent splashing.

The contact guard 10 may further comprise a conical end portion 92 extending from the distal body 32. The conical end portion 92 may be configured to extend away (e.g., downwardly) from the distal body 32 to prevent splash back or user contact with the distal body 32. In this regard, the size of the opening extending through the conical end portion 92 adjacent the distal body 32 may be larger than the end of the opening opposite the distal body 32. The conical end portion 92 may include an inwardly tapering outer surface 94, as well as an inwardly tapering inner surface 96. The degree of the taper may differ between the inner and outer surfaces 94, 96, which may result in a non-parallel relationship therebetween. The conical end portion 92 may additionally include an annular wall 98 that may be configured to be received in the annular channel 86 formed in the distal body 32. In this regard, the annular wall 98 may be externally threaded and may be configured to engage with internal threads formed on the annular channel 86.

The contact guard 10 may be fabricated from metal (e.g., stainless steel), plastic, or other materials known in the art.

In use, the contact guard 10 may be connected to the water faucet housing 12, either as a retrofit, or during initial assembly thereof. What the water faucet is actuated, water may flow through the aerator 90 and through the central passageway 22 of the contact guard 10. The hollow, annular configuration of the contact guard 10 allows the contact guard 10 to form a physical barrier around the water dispensed by the water faucet housing 12. The dispensed water may be used for a variety of purposes, e.g., cleaning hands, washing dishes, rinsing items, etc. As the water contacts the items, such as the hands or dishes, splashback may occur. However, in the event splashback reaches the contact guard 10, the external surfaces of the contact guard 10 are defined by the guard extensions 24 and the conical end portion 92. As such, the splashback may simply run off, over the guard extensions 24 and/or the conical end portion 92, while being kept away from outlet on the water faucet housing 12, which may be a point of vulnerability for contamination. In the event a blockage occurs within the contact guard 10, the auxiliary passageways 26 may be used to route water around the blockage. Thus, the use of the contact guard 10 provides several sanitary benefits, without disrupting the normal operation of the faucet 12.

Figure 2:
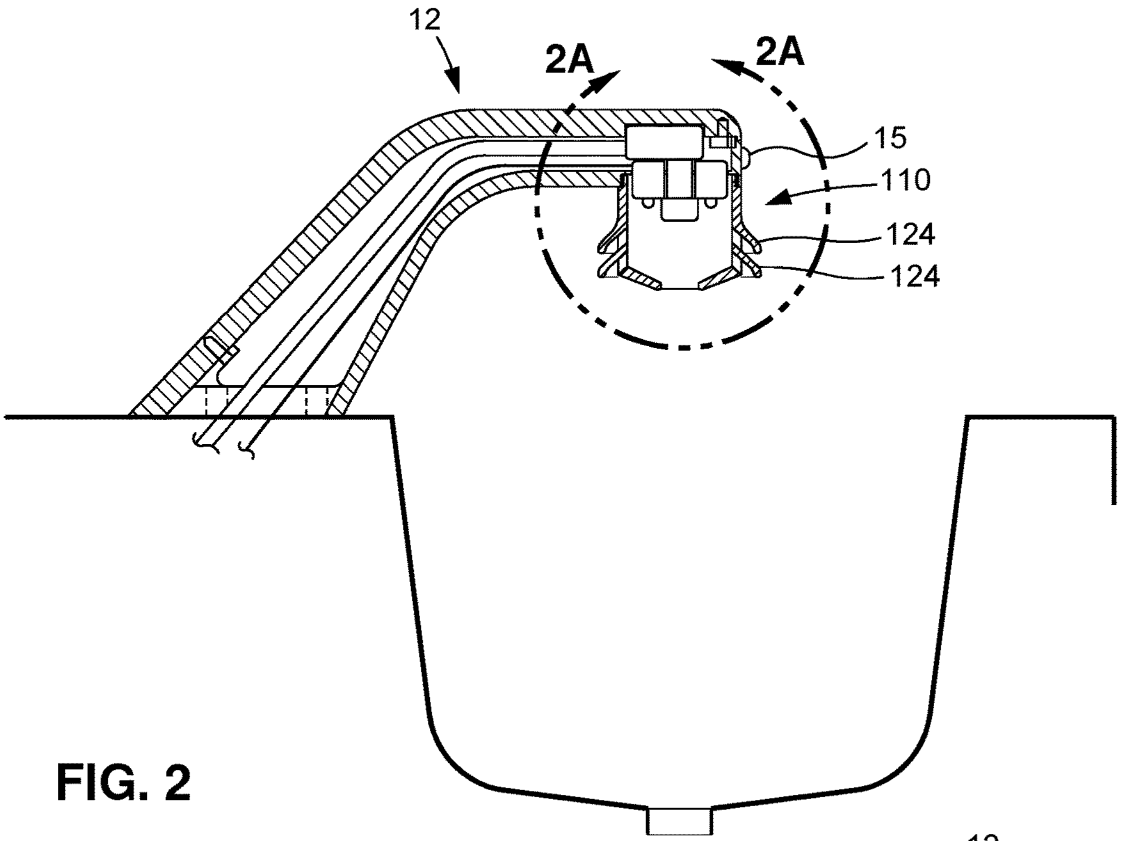
FIG. 2 is a side cross sectional view of a second embodiment of a contact guard connected to a faucet.
Figure 2A:
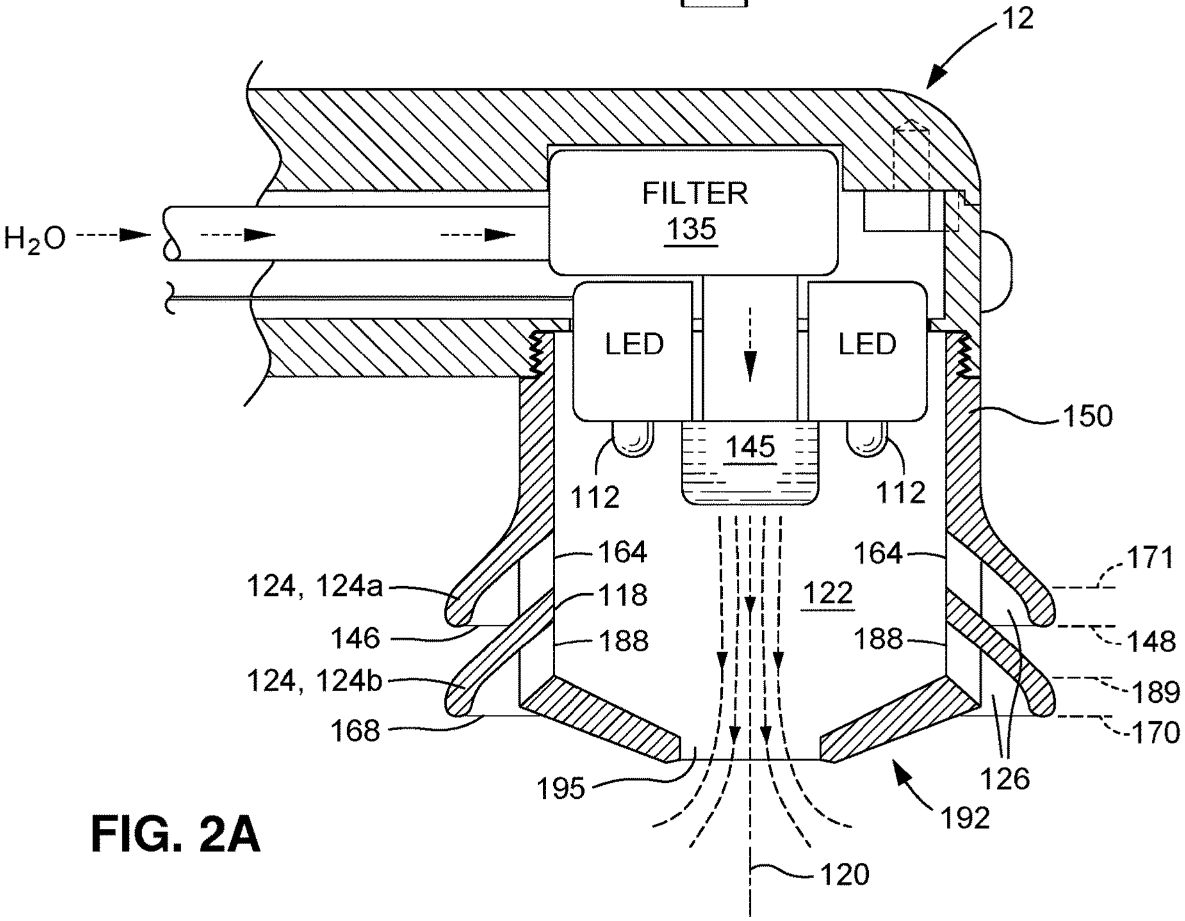
FIG. 2A is an enlarged side cross sectional view of the contact guard and an adjacent end portion of the faucet depicted in FIG. 2.

Referring now to FIGS. 2 and 2A, there is depicted another embodiment of a contact guard 110. Some of the distinctive features of the contact guard 110 relative to contact guard 10 is that contact guard 110 is formed as a unitary structure and includes one or more light-emitting diodes (LEDs) 112 which may be selectively illuminated to provide sanitizing light on the interior of the contact guard 110 to enhance the sanitizing capabilities of the contact guard 110. Note that although the LEDs 112 are shown in connection with the contact guard 110, it is contemplated that the LEDs 112 may also be incorporated into the contact guard 10.

The contact guard 110 may include an inner surface 118 extending about a central axis 120. The inner surface 118 may include a proximal end portion and a distal end portion, and may define a central passageway 122 extending between the proximal end portion and the distal end portion along the central axis 120. The contact guard 110 may additionally include a plurality of guard extensions 124 at an outer periphery thereof to provide a physical barrier around the central passageway 122. The guard extensions 124 may define one or more auxiliary passageways 126, with each auxiliary passageway 126 being defined by at least one guard extensions 124. The auxiliary passageways 126, may function as overflow passageways in communication with the central passageway 122. The auxiliary passageways 126 may include a radial component extending radially outward relative to the central axis 120 and a secondary component angled relative to the radial component. An adjacent pair of adjacent guard extensions 124 may include at least one portion that overlaps each other, which may prohibit inadvertent splash back of water into the faucet housing 12. Along these lines, a proximal guard extension 124*a* includes a proximal guard tip edge 146 and a distal guard extension 124*b* includes a distal guard tip edge 168.

Furthermore, each auxiliary passageway 126 includes an opening 164, 188 that passes through the inner surface 118, wherein each opening 164, 188 includes an upper end and an opposing lower end. As can be seen in FIG. 2A, the lower end of opening 164 defines a plane 171 that is positioned above a plane 148 that is defined by the proximal guard tip edge 146. Similarly, the lower end of opening 188 defines a plane 189 that is positioned above a plane 170 that is defined by the distal guard tip edge 168.

The contact guard 110 may additionally include a conical end portion 192 that extends inwardly and downwardly from a distal end portion of the sidewall 150 and defines a distal-most opening 195 through which the water is dispensed to the user.

The LEDs 112 may be positioned adjacent a proximal portion of the contact guard 110. In this regard, the LEDs 112 may be connected to a sidewall 150 of the contact guard 110, or alternatively, the LEDs 112 may be connected to the water faucet housing 12 and may extend into the contact guard 110 when the contact guard 110 is connected to the water faucet housing 12. As an alternative, the LEDs 112 may be mounted external to the contact guard internal cavity, and the light generated by the LEDs 112 may be transferred into the internal cavity using suitable fiber optics. The LEDs 112 may be illuminated to direct sanitizing light onto the inner surface 118 of the contact guard 110. The light may be UV-A or UV-C type light. The LEDs 112 may be operative connected to the proximity sensor 15 such that the LEDs 112 may be actuated by the proximity sensory 15 in response to detection of a user in proximity to the water faucet housing 12, and the LEDs 112 may be deactivated in response to the user leaving the area adjacent the water faucet housing 12.

The inside surface of the contact guard 110 may include a layer of Titanium Dioxide ($TIO_2$), particularly when UV-A light is used, to facilitate a photocatalytic process that may sterilizes the inside of the contact guard 110 to protect against contamination of germs. For more information regarding the use of UV sterilizing light, as well as the use of a germ protective coating, please refer to US Patent Publication No. 2015/0158750 entitled Water Faucet with Integrated Contact and Contamination Protector and Photocatalytic Disinfection, the contents of which are expressly incorporated herein by reference. Although $TIO_2$ is described as a germ protective coating, other germ protective coatings known in the art may also be used without departing from the spirit and scope of the present disclosure.

A filter 135 may be positioned upstream of an aerator 145 (relative to the flow of water) and may be configured to remove particulate from the water before the water enters the aerator 145. The filter 135 may also be configured to filter out contaminants that may be introduced via retrograde contamination. The filter 135 may be positioned in the water filter housing 12, or alternatively, the filter 135 may be positioned upstream of the water filter housing 12.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A contact guard for a water faucet housing having a discharge end portion configured to discharge water along a discharge axis, the contact guard comprising:

a proximal body configured to be engageable to the faucet housing, the proximal body having:

a proximal central passageway extending along a proximal central axis, the proximal central passageway being alignable with the discharge axis when the proximal body is engaged with the faucet housing;

a proximal flange extending in a direction away from and perpendicular to the proximal central axis, the proximal flange having a first surface and an opposing second surface, the first surface of the proximal flange being positioned directly adjacent the faucet housing when the proximal body is engaged to the faucet housing; and a proximal guard extending from the proximal flange in a direction away from and perpendicular to the proximal central axis, and an axial direction parallel to the proximal central axis and away from the first surface of the proximal flange, the proximal guard terminating at a proximal guard tip edge residing in a proximal guard tip plane;

an intermediate body connectable to the proximal body, the intermediate body having:

an intermediate central passageway extending along an intermediate central axis, the intermediate central passageway being alignable with the proximal central passageway when the intermediate body is connected to the proximal body;

an intermediate flange extending in a direction away from and perpendicular to the intermediate central axis, the intermediate flange having a first surface and an opposing second surface, the first surface of the intermediate flange being positioned directly adjacent the proximal body when the intermediate body is engaged to the proximal body; and an intermediate guard extending from the intermediate flange in a direction away from and perpendicular to the intermediate central axis, and an axial direction parallel to the intermediate central axis and away from the first surface of the intermediate flange, the intermediate guard terminating at an intermediate guard tip edge residing in an intermediate guard tip plane;

the intermediate body and the proximal body being configured such that when the intermediate body is connected to the proximal body, the first surface of the intermediate flange resides between the proximal guard tip plane and the second surface of the proximal flange; and a distal body connectable to the intermediate body, the distal body having:

a distal central passageway extending along a distal central axis, the distal central passageway being alignable with the intermediate central passageway when the distal body is connected to the intermediate body;

a distal flange extending in a direction away from and perpendicular to the distal central axis, the distal flange having a first surface and an opposing second surface, the first surface of the distal flange being positioned directly adjacent the intermediate body when the distal body is engaged to the intermediate body; and a distal guard extending from the distal flange in a direction away from and perpendicular to the distal central axis, and an axial direction parallel to the distal central axis and away from the first surface of the distal flange, the distal guard terminating at a distal guard tip edge;

the distal body and the intermediate body being configured such that when the distal body is connected to the intermediate body, the first surface of the distal flange resides between the intermediate guard tip plane and the second surface of the intermediate flange.

2. The contact guard as recited in claim 1, wherein the proximal body includes an annular channel extending into the proximal flange from the second surface of the proximal flange and the intermediate body includes an annular wall configured to be receivable within the annular channel to facilitate engagement between the proximal body and the intermediate body.

3. The contact guard as recited in claim 1, wherein the intermediate body includes an annular channel extending into the intermediate flange from the second surface of the intermediate flange and the distal body includes an annular wall configured to be receivable within the annular channel to facilitate engagement between the intermediate body and the distal body.

4. The contact guard as recited in claim 1, wherein the proximal body is configured to be threadingly engageable with the intermediate body.

5. The contact guard as recited in claim 4, wherein the intermediate body is configured to be threadingly engageable with the distal body.

6. The contact guard as recited in claim 1, further comprising an aerator coupled to the proximal body and in fluid communication with the proximal central passageway.

7. The contact guard as recited in claim 1, wherein the proximal body includes a cylindrical wall extending from the proximal flange and around the proximal central axis, the cylindrical wall being configured to facilitate engagement with the faucet housing.

8. The contact guard as recited in claim 1, further comprising a conical end portion extending from the distal flange.

9. A contact guard for a water faucet housing having a discharge end portion configured to discharge water along a discharge axis, the contact guard comprising:

an inner surface extending about a central axis, the inner surface having a proximal end portion and a distal end portion and defining a central passageway extending between the proximal end portion and the distal end portion along the central axis; and a plurality of guard extensions arranged in spaced relation to each other, at least one pair of the guard extensions which are directly adjacent each other forming an auxiliary flow channel in fluid communication with the central passageway, the auxiliary flow channel having a radial component extending in a direction away from and perpendicular to the central axis and a secondary component angled relative to the radial component, the at least one pair of guard extensions which are directly adjacent to each other including first and second guard extensions, with the first guard extension having at least one portion that overlaps with the second guard extension along an axis perpendicular to the central axis.

10. The contact guard as recited in claim 9, wherein the inner surface and the plurality of guard extensions are formed from a single unitary structure.

11. The contact guard as recited in claim 9, wherein the plurality of guard extensions are detachably connectable to each other.

12. The contact guard as recited in claim 9, wherein the auxiliary flow channel includes a curved segment.

13. The contact guard as recited in claim 9, further comprising at least one LED positioned in optical alignment with the inner surface.

14. The contact guard as recited in claim 9, further comprising an aerator in fluid communication with the central passageway.

15. The contact guard as recited in claim 9, further comprising a cylindrical wall extending around the central axis, the cylindrical wall being configured to facilitate engagement with the faucet housing.

16. A contact guard for a water faucet housing having a discharge end portion configured to discharge water along a discharge axis, the contact guard comprising:

a proximal body configured to be engageable to the faucet housing, the proximal body having:

a proximal central passageway extending along a proximal central axis, the proximal central passageway being alignable with the discharge axis when the proximal body is engaged with the faucet housing;

a proximal flange extending in a direction away from and perpendicular to the proximal central axis, the proximal flange having a first surface and an opposing second surface, the first surface of the proximal flange being positioned directly adjacent the faucet housing when the proximal body is engaged to the faucet housing; and a proximal guard extending from the proximal flange in a direction away from and perpendicular to the proximal central axis, and an axial direction parallel to the proximal central axis and away from the first surface of the proximal flange, the proximal guard terminating at a proximal guard tip edge residing in a proximal guard tip plane; and a distal body connectable to the proximal body, the distal body having:

a distal central passageway extending along a distal central axis, the distal central passageway being alignable with the proximal central passageway when the distal body is connected to the proximal body;

a distal flange extending in a direction away from and perpendicular to the distal central axis, the distal flange having a first surface and an opposing second surface, the first surface of the distal flange being positioned directly adjacent the proximal body when the distal body is engaged to the proximal body; and a distal guard extending from the distal flange in a direction away from and perpendicular to the distal central axis, and an axial direction parallel to the distal central axis and away from the first surface of the distal flange, the distal guard terminating at a distal guard tip edge residing in a distal guard tip plane;

the distal body and the proximal body being configured such that when the distal body is connected to the proximal body, the first surface of the distal flange resides between the proximal guard tip plane and the second surface of the proximal flange.

17. The contact guard as recited in claim 16, wherein the proximal body includes an annular channel extending into the proximal flange from the second surface of the proximal flange and the distal body includes an annular wall configured to be receivable within the annular channel to facilitate engagement between the proximal body and the distal body.

18. The contact guard as recited in claim 16, further comprising an aerator coupled to the proximal body and in fluid communication with the proximal central passageway.

19. The contact guard as recited in claim 16, wherein the proximal body includes a cylindrical wall extending from the proximal flange and around the proximal central axis, the cylindrical wall being configured to facilitate engagement with the faucet housing.

20. The contact guard as recited in claim 16, further comprising a conical end portion extending from the distal flange.

* * * * *